United States Patent [19]

Nakaoki

[11] Patent Number: 4,498,241

[45] Date of Patent: Feb. 12, 1985

[54] HEIGHT GAUGE

[75] Inventor: Tokuzo Nakaoki, Kawasaki, Japan

[73] Assignee: Mitutoyo Mfg. Co., Ltd., Tokyo, Japan

[21] Appl. No.: 405,005

[22] Filed: Aug. 4, 1982

[30] Foreign Application Priority Data

| | | | |
|---|---|---|---|
| Aug. 10, 1981 | [JP] | Japan | 56-118472[U] |
| Sep. 14, 1981 | [JP] | Japan | 56-145046 |
| Sep. 14, 1981 | [JP] | Japan | 56-145047 |

[51] Int. Cl.³ .......... G01B 5/00

[52] U.S. Cl. .......... 33/172 R; 33/143 K; 33/170

[58] Field of Search .......... 33/172 B, 170, 143 K, 33/172 R, 169 R, 169 B, 171, 172 E

[56] References Cited

U.S. PATENT DOCUMENTS

| | | | |
|---|---|---|---|
| 943,010 | 12/1909 | Dost | 33/171 |
| 2,551,671 | 5/1951 | Harris | 33/143 K |
| 3,289,310 | 12/1966 | Stone | 33/170 |
| 3,803,719 | 4/1974 | Nishina | 33/172 R |
| 3,811,192 | 5/1974 | Christensen | 33/170 |

FOREIGN PATENT DOCUMENTS

| | | | |
|---|---|---|---|
| 961497 | 11/1949 | France | 33/170 |
| 1427552 | 12/1965 | France | 33/172 R |
| 996095 | 6/1965 | United Kingdom | 33/170 |

*Primary Examiner*—William D. Martin, Jr.

*Attorney, Agent, or Firm*—Flynn, Thiel, Boutell & Tanis

[57] ABSTRACT

A height gauge wherein a support or supports for movably supporting a slider are supported at the proximal ends thereof by a base, and a control wheel for operating a driving mechanism for driving the slider along the support or supports is provided on the base but not on the slider.

13 Claims, 9 Drawing Figures

HEIGHT GAUGE

BACKGROUND OF THE INVENTION

1. Field of the Invention

This invention relates to a height gauge rested on a surface plate or the like for measuring a height of a workpiece to be measured and marking-off, and more particularly to improvements in construction of a height gauge for moving a slider supported by a support or supports.

2. Description of the Prior Art

Heretofore, there has been practiced that, in moving a slider slidably provided on a support or supports, the slider is directly grasped to be vertically moved, or a control wheel mounted on the slider is rotated, whereby a pinion connected to this control wheel is turned and moved along a rack provided on the support or supports.

However, in the former, a deflecting force is rendered to the support or supports and, in the latter, vibrations are rendered to the support or supports and the slider, thus contributing to cause dimensional errors and the like to height gauges performing measurement with high accuracy. Furthermore, the latter presents such a disadvantage that the pinion and the rack are subjected to the operating force of the control wheel and are worn, whereby backlashes between the pinion and the rack are increased, thus decreasing the measuring accuracy and marking-off accuracy. Further, parts for moving the slider such as the control wheel and the pinion are mounted on the slider, thus presenting such problems that the slider is increased in its dimensions and weight, an internal mechanism thereof is complicated and so forth. These problems lead to use of a rugged support or supports in order to prevent deflections of the supports due to the weight thus increased, whereby the height gauge as a whole is increased in weight, becomes inconvenient in handling and is raised in production costs. Furthermore, in both the former and the latter, the operated portion moves vertically as the slider moves, whereby, with a large-sized height gauge, an operator must change his measuring posture, thus presenting the disadvantage of being inconvenient in handling.

SUMMARY OF THE INVENTION

The present invention has as its object the provision of a height gauge capable of performing marking-off work and dimensional measurement with high accuracy and being excellent in controllability.

To achieve the above-described object, the present invention contemplates that a control wheel for operating a moving mechanism for causing the slider to move along the support or supports is provided on a base, so that the operation of moving the slider is made possible only by manual handling.

DETAILED DESCRIPTION OF THE PREFERRED EMBODIMENTS

Figure 1:
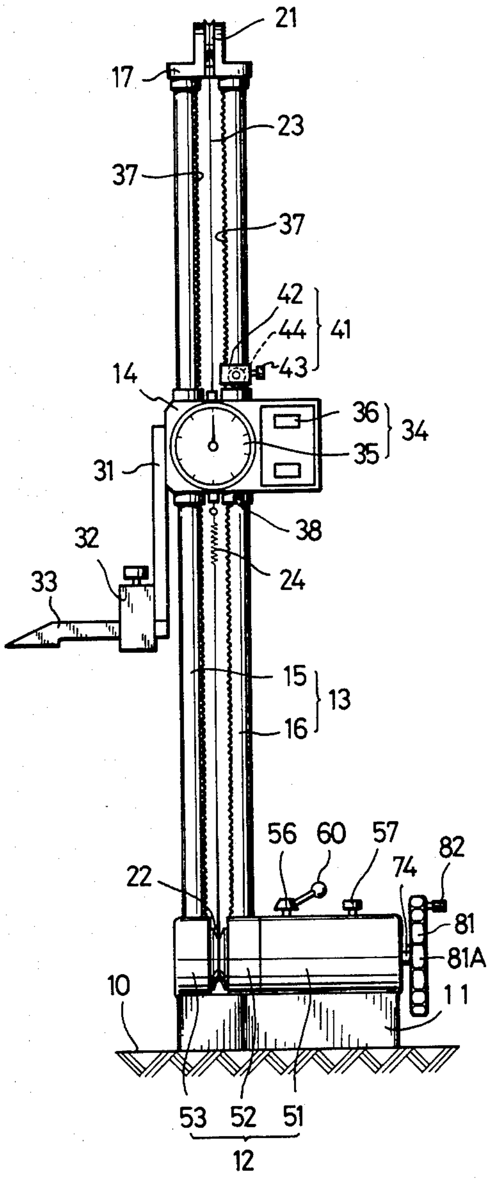
FIG. 1 is a front view showing the general arrangement of a first embodiment of the height gauge according to the present invention.
Figure 2:
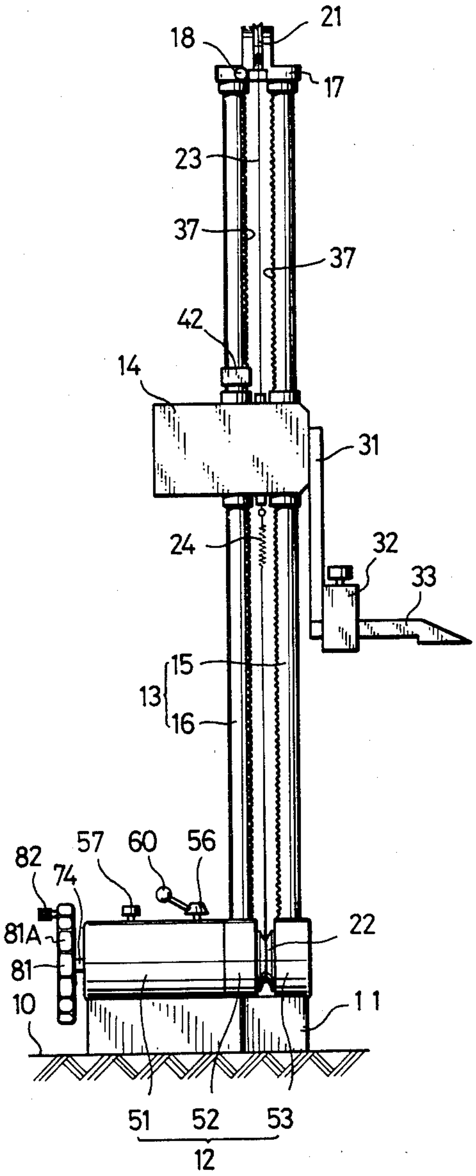
FIG. 2 is a rear view thereof.
Figure 3:
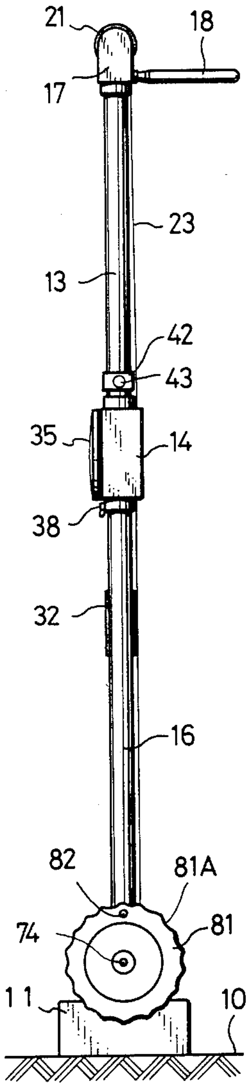
FIG. 3 is a side view thereof.

FIGS. 1 through 3 show a first embodiment of the height gauge according to the present invention, in which the bottom surface of a base 11 rested on a surface plate 10 is finished to an accurate flat surface, proximal ends of supports 13 are supported on the base 11 through a tilting mechanism 12, and a slider 14 is movably supported on the supports 13.

The supports 13 are formed of two round bar members 15 and 16 disposed in parallel to each other and the top end portions of these round bar members 15 and 16 are connected and affixed to each other through a connecting member 17. A support leg 18 having a predetermined length projects from the connecting member 17 in the horizontal direction to the right in FIG. 3, and the forward end portion of this support leg 18 is adapted to abut against the surface plate 10 so as to stably support the supports 13 in the horizontal direction when the supports 13 are laid down horizontally.

An upper pulley 21 is rotatably provided on the top end portions of the supports 13 through the connecting member 17, while, a lower pulley 22 is rotatably provided on the bottom end portions of the supports 13, and a driving wire 23 such as a flexible cord-like member formed of twisted steel wires or the like is stretched across these upper and lower pulleys 21 and 22.

One end of the driving wire 23 is affixed through a compression coil spring 24 to the slider 14 and the other end of the driving wire 23 is wound around the lower pulley 22 by about one and a half turns, thereafter, extends upwardly, further, is movably inserted through a small hole, not shown, vertically penetratingly provided in the slider 14, thereupon, is wound around the upper pulley 21 by about a half turn, then, extends downwardly, and is affixed to the upper surface of the slider 14, whereby the driving wire 23 is formed into an endless loop. Namely, the slider 14 is affixed to the intermediate portion of the endless driving wire 23, and the slider 14 is adapted to be movable along the supports 13 as the driving wire 23 turns around. In addition, the compression coil spring 24 is formed of a comparatively strong spring, the driving wire 23 has a satisfactorily strong tension, and the respective pulleys 21 and 22, particularly, the lower pulley 22 wound around by one and half turns and the driving wire 23 are engaged with each other through a strong frictional force, so that no slip can occur therebetween.

Detachably secured to one end edge of the slider 14 through a jaw 31 and a jaw clamp 32 is a scriber 33, which is replaceable with a marking-off pin, not shown, as necessary. Additionally, an indicating device 34 for indicating a value of displacement of the slider 14 along the supports 13 is provided on the front surface of the slider 14. The indicating device 34 comprises an analogue indicating portion 35 for analogue-indicating the displacement value with a needle and a digital indicating portion 36 for digitally indicating the displacement value. The indicating device 34 is brought into meshing engagement with a rack 37 formed on the support 13 in the longitudinal direction thereof and adapted to be driven by a pinion, not shown, for driving the indicating device, which is incorporated in the slider 14. Further, the indicating device 34 can be reset, zeroing its indication at a desired position.

The slider 14 is provided thereon with a slider clamp 38 capable of affixing the slider 14 at a desired position on the supports 13, and this clamp 38 is of such an arrangement that the tip end of a screw penetrating through the slider 14 is brought into abutting contact with the peripheral surface of the round bar member 16 to thereby fix the slider 14.

Further, the slider 14 is provided thereon with a fine feed device 41 capable of fine feed-adjusting the slider 14 along the supports 13. This fine feed device 41 comprises a substantially short cylinder-shaped feed tube 42 slidably coupled onto the round bar member 16, a setscrew 43 for locking the feed tube 42 into a desired position against the support 13, and an eccentric cam 44 partially coupled into the feed tube 42 and made variable in angle of rotation from outside. The feed tube 42 is locked against the support 13 by means of the setscrew 43 in a state where the cam surface of this eccentric cam 44 is abutted against the slider 14, and then, the eccentric cam 44 is rotated by a predetermined value, whereby a fine feed adjustment required for the slider 14 is effected.

Figure 4:
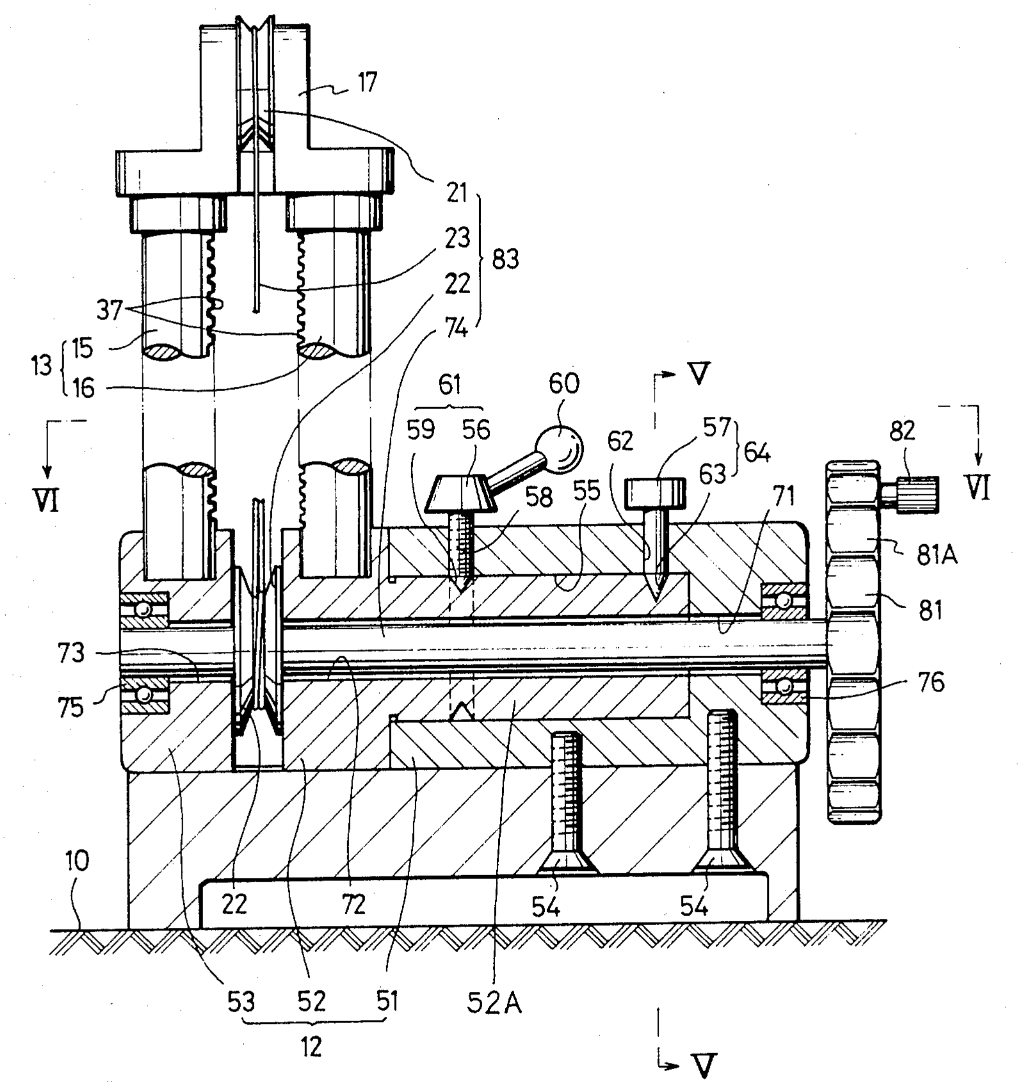
FIG. 4 is a sectional view showing the base portion in the first embodiment.

As enlargedly shown in FIG. 4, the tilting mechanism 12 includes a support member 51, and first and second rotators 52 and 53.

The support member 51 is formed into a cylinder, and affixed transversely to a base 11 by means of a plurality of locking bolts 54. Formed in the left end portion of the support member 51 coaxially therewith and to a predetermined value of depth as shown in FIG. 4 is a columnar recess 55, into which is rotatably coupled a stepped column-like small diameter portion 52A of the first rotator 52, whereby the first rotator 52 is coaxially and rotatably coupled into the support member 51. On the other hand, the second rotator 53 is disposed at a position further leftwardly of the first rotator 52 through a predetermined value of interval, and the lower pulley 22 is interposed between the first and the second rotators 52 and 53. Additionally, the proximal end portions of the round bar members 16 and 15 are planted in the first and the second rotators 52 and 53, respectively, and the first and the second rotators 52 and 53 are adapted to rotate in synchronism with each other at all times.

Mounted on the upper side surface of the support member 51 in the drawing are a clamping bolt 56 for holding the supports 13 in a desired tilted state and a fixing pin 57 for fixing the supports 13 at any one of some predetermined tilt angles, respectively.

The clamping bolt 56 is threadably coupled into a threaded hole 58 penetrated through the support member 51, and the sharpened forward end portion of the clamping bolt 56 is adapted to be frictionally engageably abutted against a groove surface of an engaging groove 59 being V-shaped in cross section, which is circularly notched in the circumferential direction in a predetermined position on the outer peripheral surface of the small diameter portion 52A. Secured to the head portion of the clamping bolt 56 is a lever 60, by means of which the operation of frictional engagement or disengagement between the clamping bolt 56 and the engaging groove 59 can be facilitated. Here, the clamping bolt 56 and the engaging groove 59 constitute first tilt angle setting means 61 for fixing the rotators 52 and 53, i.e., the supports 13 relative to the support member 51, i.e., the base 11 at a desired angle.

Figure 5:
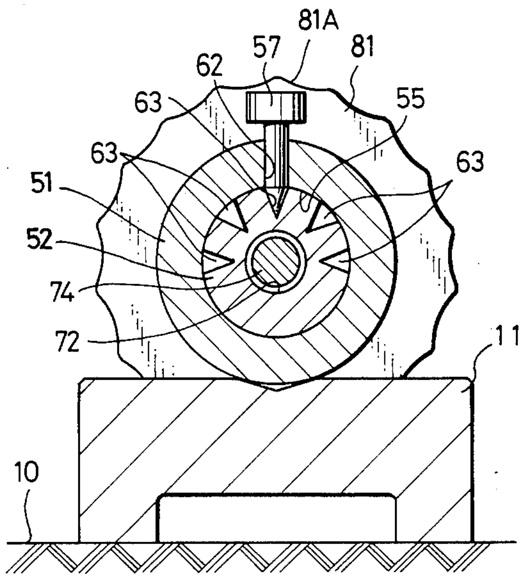
FIGS. 5 and 6 are sectional views taken along the lines V—V and VI—VI in FIG. 4.

On the other hand, the fixing pin 57 is inserted into an insert hole 62 penetrated at a predetermined position of the support member 51, and the sharpened forward end portion of the fixing pin 57 can be inserted into one of fixing holes 63 of the small diameter portion 52A. A predetermined number of these fixing holes 63 are penetrated in the radial direction of the small diameter portion 52A along the circumference thereof at predetermined intervals (Refer to FIG. 5), and the supports 13 can be held at one of predetermined tilt angles or in the vertical state depending on any one of the positions of the fixing holes 63 thus penetrated. Here, the fixing pin 57 and the fixing holes 63 constitute a second tilt angle setting means 64 for fixing the rotators 52 and 53, i.e., the supports 13 relative to the support member 51, i.e., the base 11 at one of predetermined angles.

The support member 51, the first and the second rotators 52 and 53 are disposed coaxially with one another, and penetrated through the center axis portions of the support member 51, rotators 52 and 53 are through-holes 71, 72 and 73, through which a drive shaft 74 extends.

One end portion of the drive shaft 74 is supported by the second rotator 53 through a bearing 75, and the other end portion thereof is supported by the support member 51 through a bearing 76, whereby the drive shaft 74 is made rotatable in the through-holes 71, 72 and 73. Additionally, the right end portion of the drive shaft 74 as shown in FIG. 4 is projected from the support member 51 by a predetermined value of length, and affixed to the projected end is a control wheel 81. The control wheel 81 is formed into a substantially disk shape being relatively thick, provided at the outer peripheral portion thereof with a substantially polygonal grip portion 81A, and has a small columnar finger grip 82 rotatably, projectingly provided at a predetermined position of the right side surface thereof in the drawing.

The lower pulley 22 is fixed between the first and the second rotators 52 and 53 of the drive shaft 74, and, when the control wheel 81 is operated to rotate the drive shaft 74, the lower pulley 22 is rotated, whereby the driving wire 23 is turned around, so that the slider 14 can be moved along the supports 13. Here, the drive shaft 74, the upper pulley 21, the lower pulley 22 and the driving wire 23 constitute a driving mechanism 83 for moving the slider 14 along the supports 13.

Figure 6:
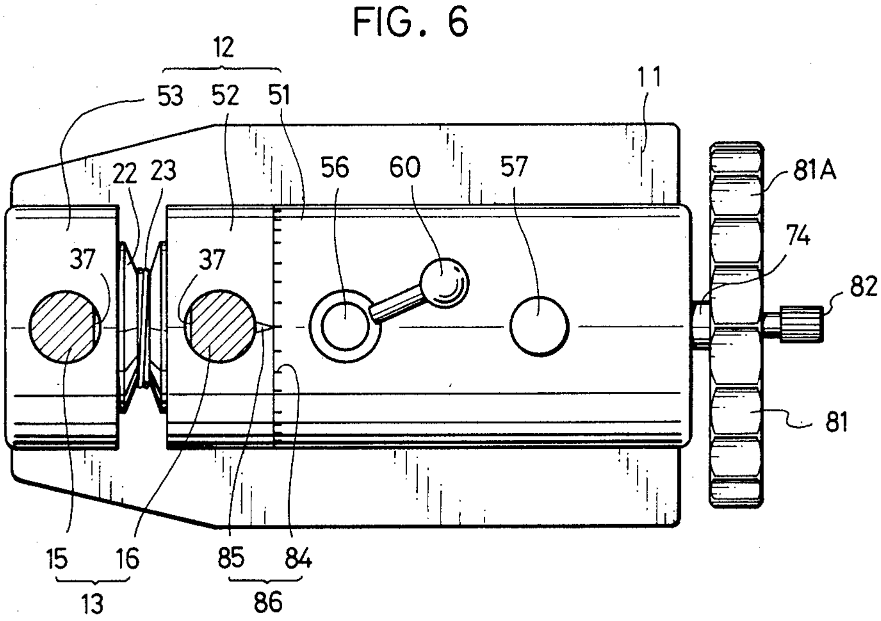

As shown in FIG. 6, a graduated portion 84 for indicating an angle of rotation of the first rotator 52, i.e., a tilt angle of the supports 13 is formed at an end portion of the outer peripheral surface of the support member 51 on the side of the first rotator 52. This graduated portion 84 and a needle 85 provided on the first rotator 52 constitute an angle indicating device 86 for indicating a tilt angle of the supports 13.

Description will hereunder be given of operation of the present embodiment.

Measurement of a height in a direction on a vertical base line and marking-off work in a direction on a horizontal base line are performed in the same manner as with the conventional height gauge. However, when measurement is performed in a direction tilted a predetermined angle from the vertical base line or the horizontal base line, the measurement is performed in the following manner.

In a state where the supports 13 are vertically disposed in the direction on the vertical base line, if the lever 60 of the first tilt angle setting means 61 is operated to slightly loosen the clamping bolt 56 upon releasing the fixing pin 57 of the second tilt angle setting means 64, then the first rotator 52 comes to be rotatable relative to the support member 51. In this case, the clamping bolt 56 must not be loosened excessively because the forward end portion of the clamping bolt 56, which still remains within the engaging groove 59, functions as a lock for preventing the first rotator 52 from being dislodged in the axial direction thereof. Additionally, the supports 13 are made free by the above-described operation because the second rotator 53 is rotatable relative to the drive shaft 74 at all times. Under this condition, the supports 13 are directly held and tilted to a desired tilt angle, utilizing the angle indicating device 86, and then, the clamping bolt 56 is tightened, whereby the first rotator 52 is affixed to the base 11, so that the supports 13 can be fixed at a predetermined tilt angle. In setting this tilt angle, the driving mechanism 83 and the tilt angle setting means 61, 64 do not interfere with one another, whereby no movement of the slider 14 relative to the supports 13 is accompanied therewith.

If the support member 51 mounted on the base 11 is grasped and caused to slide on the surface plate 10, the scriber 33 is abutted against a surface to be measured of a workpiece, and the control wheel 81 is operated to move the slider 14 along the supports 13 by means of the driving mechanism 83, then, a displacement value of this slider 14 is indicated by the indicating device 34, so that measurement of dimensions of the surface to be measured in the direction of a predetermined tilt angle can be performed.

In a condition where the clamping bolt 56 is loosened, the fixing pin 57 of the first tilt angle setting means 64 is inserted into a suitable one of the plurality of fixing holes 63 of the first rotator 53, whereby the first rotator 52 is affixed to the base 11 at a predetermined angle by one touch operation, so that the tilt angle of the supports 13 can be set as well, thus enabling to perform measurement in the direction of the tilt angle in this condition in the same manner as described above.

In order to perform measurement of dimensions in the direction on the horizontal base line, the height gauge mounted on the base 11 may be caused to slide on the surface plate 10 in the same manner as with the conventional height gauge, or, with the base 11 being held in the same position on the surface plate 10, the supports 13 are laid down to a position where the support leg 18 abuts against the surface plate 10, and, in this condition, the slider 14 may be moved along the supports 13.

In addition, when a marking-off work is to be performed by use of the present embodiment, a marking-off pin is mounted in place of a scriber 33, and, in this condition, the slider 14 is moved, whereby the work can be performed in the same manner as with the conventional height gauge. If a circular arc is to be marked off on a surface of the workpiece, then, in a condition where the slider 14 is affixed to a predetermined positions on the supports 13 by means of the slider clamp 38, the tilt angle of the supports 13 may be varied with the marking-off pin being abutted against the surface to be marked off. Further, when a fine feed of the slider 14 along the supports 13 is required in the above-described marking-off work and measuring operation for the workpiece, the fine feed device 41 is utilized. Namely, after the feed tube 42 is locked against the support 13 by means of the set-screw 43, the eccentric cam 44 is rotated to perform the operation.

In storing the height gauge of the present embodiment upon completion of the works such as measurement, the support member 51 is grasped to be carried and stored, with no hand touching the portions such as the supports 13 and the slider 14, which would affect the accuracies in work if they would be touched.

The present embodiment with the above-described arrangement can offer the following advantages.

Since the control wheel 81 for moving the slider 14 is secured to the base 11 but not to the slider 14, the slider 14 is reduced in weight as compared with that in the arrangement in which the control wheel for directly moving the slider is secured to the slider as in the prior art, whereby the supports 13 and the like can be decreased in weight to lower the center of gravity of the height gauge as a whole accordingly, so that a height gauge high in workability can be obtained. In addition, since vibrations of the slider 14 during operation of the control wheel 81 are eliminated, the rack and the like in the slider 14 can be prevented from being worn and/or damaged, so that the accuracies in the marking-off work and measurement of dimensions can be prevented from being lowered. Further, since a force does not act on the supports 13 in rotating the control wheel 81, the supports 13 are not deformed, so that the measuring accuracy and the like can be effectively prevented from lowering. Additionally, in the measuring work with the supports 13 being greatly tilted, lowered stability of the height gauge cannot be avoided, however, even in such a condition as described above, the work can be performed without any force directly applied to the supports 13 during rotation of the control wheel 81, and hence, the base 11 can be prevented from accidentally moving and such difficulties in operating the control wheel can be obviated which would be encountered in the conventional case where the control wheel is affixed to the slider, so that the tilting function of the supports can be performed more effectively.

Furthermore, the support member 51, being formed into a cylindrical shape, can be readily produced from a round bar material which is easily available, readily fit to the operator's hand when operated, and easily grasped. From this reason, the controllability is improved when this height gauge is caused to slide on the surface plate 10, and, in addition, at this time, the height gauge can be caused to slide on the surface plate 10 without requiring touching the supports 13 with a hand, whereby the supports 13 are not deformed, so that the accuracies in measuring dimensions and the like can be prevented from lowering. Further, in carrying this height gauge, it is necessary only to grasp the support member 51, so that such a lowered accuracy in mounting supports in the case of the conventional height gauge can be avoided which would occur due to the fact that the height gauge was carried with the supports and the like being held. In addition, the control wheel 81 is secured to the support member 51, whereby the change-over of the operator's hand from the operation of horizontal movement of the base 11 with the support member 51 being grasped to the operation of the control wheel 81 can be effected for a short period of time, namely, all of the works can be performed at one position near the hand, so that the operating efficiency can be improved without requiring to change the operating posture, thereby enabling to facilitate the operation.

Further, the support member 51, the lower pulley 22 and the first and the second rotators 52, 53 are disposed in series on one and the same axial line, so that the means for transmitting the turning force of the control wheel 81 to the lower pulley 22 can be formed of the drive shaft 74 which is very simple. Additionally, the support member 51, the rotators 52 and 53 are equal in outer dimension to one another, so that the appearance of this height gauge on the base 11 can be simplified and have an excellent configuration.

Further, the lower pulley 22 is wound therearound with the driving wire 23 by more than one turn, whereby slip between the lower pulley 22 and the driving wire 23 is prevented from occurring, so that the turning operation of the control wheel 81 can be positively transmitted to the slider 14. In addition, the driving wire 23 is biased to be constantly stretched by the tension spring 24, whereby, even if an elongation occurs to the driving wire 23 due to use for a long period of time and so forth, the elongation is absorbed by the tension spring 24, so that the driving wire 23 can be maintained in the stretched state, thereby the turning operation of the control wheel 81 can be positively transmitted to the slider 14. Further, the lower pulley 22 is rotatably supported on the base 11 and the second rotator 53 through the bearings 75 and 76, whereby the tilting operation of the supports 13 and the movement of the slider 14 do not interfere with each other, so that the convenience in use can be greatly facilitated. Additionally, the driving mechanism 83 incorporates therein the driving wire 23, whereby necessity for the provision of the rack for driving the slider 14 on the supports 13 is eliminated, so that the supports, and in its turn, the height gauge as a whole can be reduced in weight.

Further, the provision of the support leg 18 can offer the advantage that measurement in the horizontal direction and marking-off work can be performed in the highly stabilized condition.

Furthermore, the supports 13 for supporting the slider 14 are formed of two round bar members 15 and 16, so that rigidity is constant under any tilted condition, so that accurate marking-off works and measuring operations can be performed.

In addition, without requiring to inspect the angle indicating device 86, insertion of the fixing pin 57 into one of the fixing holes 63 makes it possible that the supports 13 are readily and accurately set to a predetermined tilt angle relative to the surface plate 10 by one touch operation.

Description will hereunder be given of embodiments other than the above. Same reference numerals in the preceding embodiment are used to designate same or similar parts, so that description thereof will be omitted or simplified.

Figure 7:
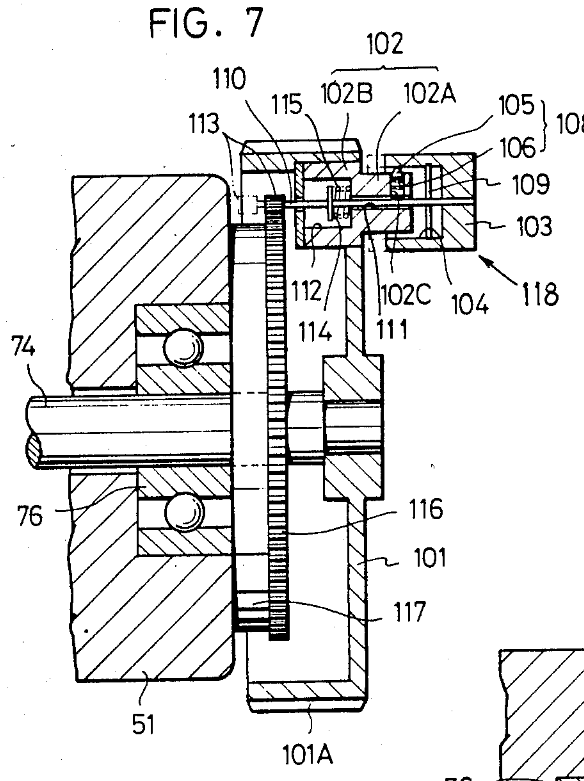
FIGS. 7 and 8 are sectional views showing the control wheel portion in a second and a third embodiments, respectively.

FIG. 7 shows the essential portions of the second embodiment, in which a control wheel 101, the central portion of which is affixed to one end of the drive shaft 74, is formed into a substantially round tray shape being open toward the support member 51, and provided on the outer peripheral portion thereof with a grip portion 101A formed into a substantially polygonal shape for facilitating to directly grip the control wheel 101. As enlargedly shown in FIG. 7, a stepped columnar guide member 102 having two outer diameters different from each other is embedded at a predetermined portion near the outer periphery of the control wheel 101. A small diameter portion 102A of this guide member 102 is projected from a side surface of the control wheel 101 to the right in the drawing and a large diameter portion 102B is positioned on the side of the support member 51 and in the state of being inserted into the control wheel 101.

Coupled onto the small diameter portion 102A projected from the control wheel 101 of this guide member 102 is a bottomed tubular finger grip 103 movable toward the support member 51 in a direction parallel to the drive shaft 74 in the drawing.

A small engaging piece 105 is disposed at a predetermined portion on the inner peripheral surface 104 of the finger grip 103 in such a manner that the engaging portion can be brought into frictional abutment with the inner peripheral surface. This engaging portion 105 is received in a small hole or recess 102C penetrated in the small diameter portion 102A in the radial direction thereof and is biased outwardly in the radial direction of the small diameter portion 102A by a spring 106 provided at the bottom of the small hole 102C. Here, the engaging portion 105 and the spring 106 constitute an engaging mechanism 108, through the agency of which the finger grip 103 can be brought into frictional abutment with the guide member 102 at a predetermined position.

A circular groove 109 is formed at a predetermined position near the bottom of the inner peripheral surface 104 along the circumference, and the top portion of the engaging portion 105 is adapted to be comparatively shallowly coupled into this circular groove 109 when the finger grip 103 advances a predetermined value toward the support member 51 in the drawing.

Provided at the bottom of the finger grip 103 is a pinion shaft 110 having a predetermined length, disposed in parallel to the drive shaft 74 and directed to the support member 51, and this pinion shaft 110 is inserted through a support hole 111 of the guide member 102 and a hollow portion 112 provided closer to the support member 51 than the support hole 111, further extended, and affixed at one end thereof near the side of the support member 51 with a pinion 113.

A receiving portion 114 such as a C-shaped washer is affixed to a predetermined portion of the pinion shaft 110 in the hollow portion 112, a compression coil spring 115 as being biasing means is confined between the right end face of the hollow portion 112 in the right in the drawing and the receiving portion 114, and the finger grip 103 and the pinion 113 are biased toward the position of the support member 51 as indicated by two-dot chain lines in the drawing by this compression coil spring 115.

In a state where the finger grip 103 is pulled in the direction of being separated from the support member 51 as indicated by solid lines in the drawing, the pinion 113 is adapted to be meshed with a gear portion 116 formed into a spur gear form, which is larger in diameter than the pinion 113. This gear portion 116 is affixed to the support member 51 through a hub portion 117, and the drive shaft 74 is inserted through the center portion of the gear portion 116. Here, the gear portion 116, the finger grip 103 and the pinion 113 constitute a fine adjustment mechanism 118.

In a state where the finger grip 103 is pulled in a direction opposite to the support member 51 and remains static so as to mesh the pinion 113 with the gear portion 116 (Refer to the solid line portion in FIG. 7), the finger grip 103 is frictionally engaged due to a frictional force of the engaging portion 105 frictionally abutted against the inner peripheral surface 104, whereby the pinion 113 is maintained in mesh with the gear portion 116. However, if the static frictional engagement between the engaging portion 105 and the inner peripheral surface 104 is lost due to rotation of the control wheel 101 or the like, then the finger grip 103 moves toward the support member 51 due to the biasing force of the coil spring 115, whereby the pinion 113 is adapted to be released from the gear portion 116.

Description will hereunder be given of operation of the present embodiment.

In a normal state where the finger grip 103 is not pulled, the finger grip 103 and the pinion 113 are moved towards the side of the support member 51 through the resiliency of the coil spring 115, whereby the pinion 113 is in a state of being released from the gear portion 116 (Refer to the two-dot chain line portion in FIG. 7). In this state, if the grip portion 101A of the control wheel 101 is directly grasped or the finger grip 103 is gripped to rotate the control wheel 101, then the slider 14 is moved along the supports 13 at high speed through the driving mechanism 83, so that the rough adjustment can be performed. In this case, in the finger grip 103, the engaging portion 105 is coupled into the circular groove 109 to be held at a position indicated by dot-dot chain lines in FIG. 7, so that such a disadvantage can be avoided that the pinion shaft 110 linearly moves by an accident, whereby the pinion 113 impinges on the gear portion 116 and so forth to thereby prevent smooth rotation of the control wheel 101 and smooth movement of the slider 14.

If the finger grip 103 is pulled to the right in FIG. 7 after the rough adjustment has been performed as described above, then the pinion 113 and the gear portion 116 are brought into meshing engagement with each other. If the finger grip 103 is rotated under the above-described meshing engagement, then the pinion 113 is moved in the circumferential direction of the gear portion 116 because the gear portion 116 is affixed to the support member 51, whereby the control wheel 101 is rotated and the driving mechanism 83 is driven by the drive shaft 74 at low speed, so that the slider 14 can be finely adjusted. In this case, if the rough adjustment would have been performed with the finger grip 103 being gripped in the state where the finger grip 103 was not pulled, then, in performing the fine adjustment, the portion to be operated (the gripped portion) would remain in the same position. Even when the grip portion 101A is directly grasped to operate the control wheel 101 for the rough adjustment, transfer from the rough adjustment to the fine adjustment can be facilitated because the finger grip 103 is provided on the control wheel 101 and the portion to be operated for the fine adjustment is disposed close to the portion operated for the rough adjustment.

When the rough adjustment is attempted again upon completion of the fine adjustment, if the finger grip 103 is pushed toward the support member 51, then the pinion 113 is released from the gear portion 116. However, without pushing the finger grip 103 toward the support member 51, rotation of the control wheel 101 causes the abutting portion of the engaging portion 105 against the inner peripheral surface 104, both of which have been in static frictional condition, to move into a dynamic frictional condition, whereby the finger grip 103 cannot resist the biasing force of the coil spring 115 to be moved to the side of the support member 51, so that the pinion 113 can be released from the gear portion 116.

In addition, when the finger grip 103 is disposed at a position indicated by solid lines in FIG. 7, and the pinion 112 and the gear portion 116 are meshed with each other, even if a hand is released from the finger grip 103, mere release of the hand does not permit the pinion 113 to be released from the gear portion 116 because the engaging mechanism 108 is provided on the finger grip 103. In consequence, when the hand is released from the finger grip 103 during fine adjustment and thereafter the finger grip 103 is to be operated, there is no need for pulling the finger grip 103 again to the right in FIG. 7.

The present embodiment with the above-described arrangement can offer the following advantages.

There are such advantages that the transfer operation from the rough adjustment to the fine adjustment or from the fine adjustment to the rough adjustment can be effected very quickly, and particularly, when the finger grip 103 is gripped to rotate the control wheel 101 for the rough adjustment in a state where the pinion 113 is released from the gear portion 116, even if the process is transferred from the rough adjustment to the fine adjustment, the finger grip 103 is operated likewise, thus enabling to offer the advantage to a remarkable extent.

Moreover, in performing the rough adjustment, the pinion 113 is reliably released from the gear portion 116 because the engaging portion 106 is coupled into the circular groove 109. Hence, when the finger grip 103 is gripped to rotate the control wheel 101, the pinion 113 can avoid accidentally impinging on the gear portion 116 and so forth, thereby offering such an advantage that the rough adjustment is facilitated.

Since the pinion 113 is normally in the state of being released from the gear portion 116 as described above, such advantages can be offered that no noises of meshing engagement occur between the pinion 113 and the gear portion 116 during rough adjustment, so that the rough adjustment is performed quietly and vibrations are minimized.

Further, the feed box, the guide support and the like for the fine adjustment are not provided entirely separately of the mechanism for the rough adjustment as in the conventional height gauge, so that such an advantage can be offered that the number of parts is reduced, thus resulting in improved workability during assembling work and the like.

Referring to a comparison with the preceding first embodiment, necessity for the fine feed device 41 is eliminated, whereby the weight load applied to the supports 13, which would otherwise have been necessary, is reduced accordingly, so that high accuracy measurement and so forth can be facilitated to a greater extent.

Furthermore, such an advantage can be offered that rotation of the control wheel 101 automatically releases the frictional engagement between the engaging portion 105 and the inner peripheral surface 104 due to a static frictional force, not requiring to push the finger grip 103 toward the support member 51 from the state where the pinion 113 is meshed with the gear portion 116 and so forth, whereby the pinion 113 is automatically released from the gear portion 116, thus resulting in excellent controllability.

Figure 8:
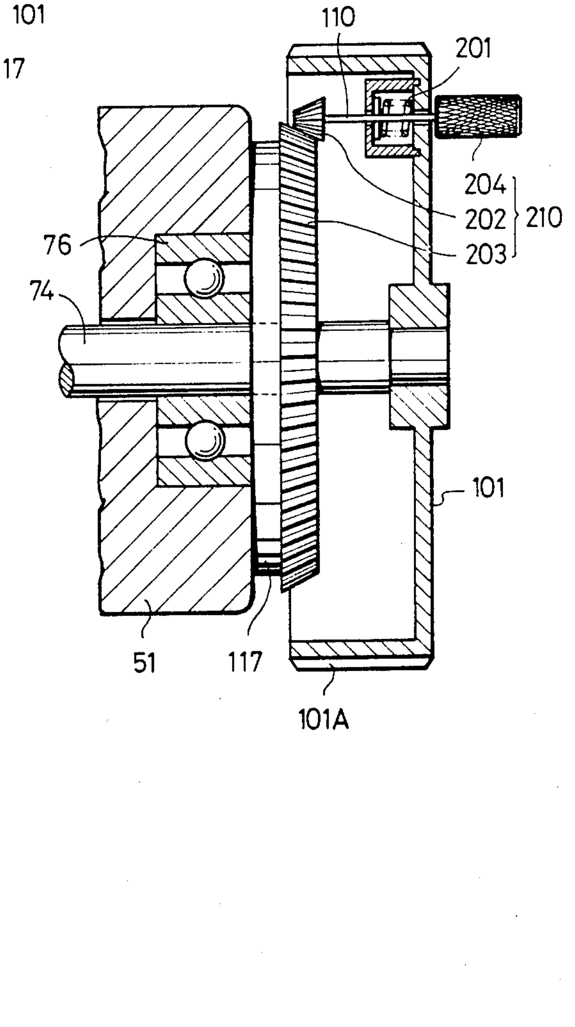

In addition, in the above-described second embodiment, when the finger grip 103 is pulled in the direction opposite to the support member 51, the pinion 113 is brought into meshing engagement with the gear portion 116. Thus, the pinion 113 is normally in the state of being released from the gear portion 116. However, such an arrangement may be adopted that, as in the third embodiment shown in FIG. 8, a pinion 202 is normally in meshing engagement with a gear portion 203 by means of a coil spring 201 as being biasing means, and, when a finger grip 204 is pulled against the resiliency of the coil spring 201 in a direction opposite to the support member 51, the pinion 202 is released from the gear portion 203. In this case, the pinion 202 and the gear portion 203 may be formed of a pair of bevel gears. In the third embodiment, a pinion 202, a gear portion 203 and a finger grip 204 constitute a fine adjustment mechanism 210.

Furthermore, in the above-described second and third embodiments, such an arrangement has been adopted that the pinion 113 or 202 is moved in the axial direction of the pinion shaft 110 and adapted to be meshed with or released from the gear portion 116 or 203, however, this arrangement may be replaced by an arrangement in which the finger grip 103 and the pinion 113 or 202 may be engaged with or released from each other at the intermediate portion of the pinion shaft 110.

Further, the driving mechanism 83 and the fine adjustment mechanism 118 or 210 have been adapted to cooperate with or be released from each other, however, this arrangement may be replaced by one in which the driving mechanism and the adjustment mechanism cooperate with each other at all times, in which case, a second finger grip for rotating the control wheel 101 may be provided on the control wheel 101 separately of the aforesaid finger grip 103.

Furthermore, the pinion 113 or 202 and the gear portion 116 or 203 may be replaced by a small friction wheel and a large friction wheel made of a material high in frictional resistance, or any other arrangement may be adopted. In short, it suffices to adopt a mechanism capable of finely adjusting the movement of the control wheel 101.

In the above-described embodiments, the supports 13 are formed of two round bar members 15 and 16, however, the number of supports may be one or more than three. The form of each round bar member should not necessarily be limited to the columnar form, but may be a prism or a flat plate. However, when the columnar form is adopted, the supports may be more effectively used when tilted, because the columnar supports 13 have excellent rigidity.

Instead of the support leg 18 of the connecting member 17 projected only at one side, support legs may be projected at both sides, so that horizontal marking-off works, etc. on the both sides of the base 11 can be performed. In this case, it should be more effective if the indicating devices 34 would be provided at both the front and rear surface of the slider 14. Further, the fine feed device 41 in the first embodiment should not necessarily be limited to the construction including the eccentric cam 44, but may be replaced by a construction used in the common height gauges, including a feed box, a feed screw, a feed nut and a set-screw.

Figure 9:
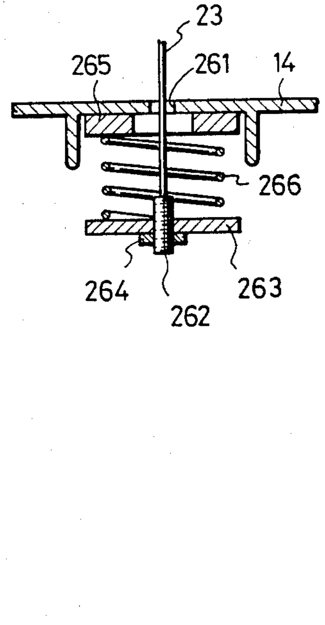
FIG. 9 is a sectional view showing a portion of the slider in an embodiment other than the above-mentioned embodiments.

The tension spring 24 provided outside the slider 14 for constantly holding the driving wire 23 in the stretched condition may be replaced by a tension spring of the type incorporated in the slider as shown in FIG. 9 to obtain the same advantage. Namely, such an arrangement may be adopted that a small hole 261 is penetrated through the upper surface of a case of the slider 14, one end of the driving wire 23 extending through this small hole 261 is affixed to an engaging member 262 formed of a small screw, this engaging member 262 is threadably coupled into a first receiving plate 263 to be fixed by a nut 264, further, a compression spring 266 is confined between the first receiving plate 263 and a second receiving plate 265 abutted against the inner surface of the slider case, and the driving wire 23 is biased to be constantly stretched by this compression spring 266.

Further, a receiving seat having a depressed portion whose cylindrical inner peripheral surface has a diameter slightly larger than the outer diameter of the rotators 52 and 53 may be formed on the base 11 in a manner to be slidable with the outer peripheral surface of the rotators 52 and 53, whereby the weight loads of the supports 13 and the like are received by this depressed portion, so that the accuracies of the supports 13 against the base 11 can be effectively maintained for a long period of time.

Furthermore, the control wheels 81 and 101 are undetachably mounted on one end of the drive shaft 74, respectively. However, the control wheels 81 and 101 may be detachably mounted or may be mounted on opposite end portions of the drive shaft 74. Or, the control wheels 81 and 101 may be provided on the upper surface or any other peripheral surface of the support member 51 by means of a pair of bevel gears provided on the intermediate portion of the drive shaft 74. In addition, when only one support is used, etc., this support is affixed to the first rotator 52 and the second rotator 53 is solidly secured to the base 11, so that the drive shaft 74 can be stably supported in a so-called doubly-supported state.

Further, the base 11 and the support member 51 may be integrally cast, so that the number of parts can be reduced.

Furthermore, in the indicating device 34, both the digital indication and the analogue indication should not necessarily be provided, and further, any one of the methods including an electrical, a magnetic and an optical ones may be applied to methods of driving and indicating for the indication.

Further, both the first and the second tilt angle setting means 61 and 64 should not necessarily be provided, but, either one may be provided as necessary. Additionally, the construction should not necessarily be limited to the above-described one, but, any other construction using a collect chuck or a worm may be adopted. Furthermore, it is preferable to use the twisted steel wires having a low elongation for the driving wire 23 as being the flexible transmitting member, however, the material of the driving wire 23 should not necessarily be limited to this, but, may be any other one.

The present invention as described hereinabove can provide a height gauge capable of performing marking-off work and dimensional measurement with high accuracy and being excellent in controllability.

What is claimed is:

1. A height gauge comprising:

a base;

a plurality of elongated supports extending away from said base, said supports having lower ends located close to said base and upper ends located remote from said base;

a tilting mechanism mounted on said base, the lower ends of said supports being connected to said tilting mechanism whereby said supports can be tilted with respect to said base;

a slider movably supported on said supports;

an indicating device for measuring the displacement of said slider along said supports;

a driving mechanism for moving said slider along said supports, said driving mechanism comprising a drive shaft extending transversely to said supports and being mounted for rotation with respect to said base, a control wheel provided at one end of said drive shaft, a lower pulley mounted for integral rotation with said drive shaft, an upper pulley mounted on said supports adjacent to the upper ends of said supports, and a flexible cord member would around said upper and lower pulleys for movement therewith, said cord member being attached to said slider so that movement of said cord member causes movement of said slider along said supports;

a fine adjustment mechanism for driving said driving mechanism at a low speed to move said slider along said supports at a low speed, said fine adjustment mechanism including a large diameter gear which is stationary with respect to said base and has a central hole therein, said drive shaft extending through said central hole and being rotatable therein, a shiftable pinion which can selectively be moved into meshing engagement with said gear, and a finger grip mounted on said control wheel and connected for integral rotation with said pinion, said finger grip being movable in a direction parallel to the lengthwise direction of said drive shaft to bring said pinion into and out of meshing engagement with said gear.

2. A height gauge as claimed in claim 1, wherein said tilting mechanism comprises a cylindrical support member secured to said base and extending transversely to said supports, and a pair of columnar rotators mounted for rotation with respect to said support member in unison with each other and being mounted coaxially with said support member, each of said columnar rotators having a lower end of one of said supports secured thereto.

3. A height gauge as claimed in claim 2, further comprising a first, continuously adjustable tilt angle setting means for positioning and securing said rotators and said supports at a selected angle of rotation with respect to said cylindrical support member.

4. A height gauge as claimed in claim 2, further comprising a second stepwise adjustable tilt angle setting means for positioning and securing said rotators and supports at a predetermined angle of rotation with respect to said cylindrical support member.

5. A height gauge as claimed in claim 3, wherein said first tilt angle setting means comprises an annular groove formed in the outer peripheral surface of one of said rotators, and a clamping bolt removably insertable through said cylindrical support member, which clamping bolt is adapted to frictionally engage said annular groove to clamp said one rotator to said cylindrical support member to prevent rotation of said rotators relative to said cylindrical support member.

6. A height gauge as claimed in claim 4, wherein said second tilt angle setting means comprises one or more radial fixing holes in the outer periphery of one of said rotators, and a fixing pin removably insertable through said cylindrical support member, one end of said fixing pin being adapted to be received in said fixing hole to prevent relative rotation between said rotators and said cylindrical support member.

7. A height gauge as claimed in claim 1, further comprising biasing means for biasing said pinion to a position in which said pinion and said gear are in meshing engagement.

8. A height gauge as claimed in claim 7, further comprising biasing means for biasing said pinion to a position in which said pinion and said gear are released from each other.

9. A height gauge as claimed in claim 8, further comprising an engaging mechanism which holds said pinion and said gear in meshing engagement against the biasing force of said biasing means.

10. A height gauge as claimed in claim 9, wherein said engaging mechanism comprises a columnar guide member, a small engaging piece supported, in a manner to be linearly movable in the radial direction of said columnar guide member, said guide member being affixed to said control wheel and having said finger grip coupled thereonto in a direction parallel to said drive shaft, and a spring for frictionally abutting said engaging piece against said finger grip.

11. A height gauge as claimed in claim 9, wherein said engaging mechanism comprises a columnar guide member fixedly mounted on said control wheel, a rotatable pinion shaft which extends through a support hole in said guide member and connects said pinion and said finger grip, an engaging piece mounted on said guide member, a spring positioned within a recess in the outer surface of said guide member for resiliently urging said engaging piece against an inner peripheral surface of said finger grip, said engaging piece frictionally engaging said finger grip and said guide member so that rotation of said finger grip causes rotation of said pinion shaft, said pinion, said control wheel, said drive shaft and said lower and upper pulleys.

12. A height gauge as claimed in claim 2, wherein said drive shaft is coaxial with said cylindrical support member and said rotators, and said drive shaft is disposed in axial through-holes in said cylindrical support member and said rotators.

13. A height gauge comprising:

a base;

a plurality of elongated supports extending away from said base, said supports having lower ends located close to said base and upper ends located remote from said base;

a tilting mechanism mounted on said base, said tilting mechanism comprising a cylindrical support member secured to said base and extending transversely to the lower ends of said supports, a pair of columnar rotators mounted for rotation with respect to said support member in unison with each other and being mounted coaxially with said support member, the lower ends of said supports being affixed to said rotators whereby said supports can be tilted with respect to said base;

a slider supported on said supports for lengthwise movement therealong;

an indicating device for measuring the displacement of said slider along said supports;

a driving mechanism for moving said slider along said supports, said driving mechanism comprising a drive shaft extending coaxially through said cylindrical support member and said rotators and means supporting said drive shaft for rotation with respect to said support member and said rotators, a control wheel provided at one end of said drive shaft, a lower pulley mounted for integral rotation with said drive shaft, an upper pulley mounted on said supports adjacent to the upper ends thereof, and a flexible elongated drive element wound around said pulleys and attached to said slider so that lengthwise movement of said drive element causes movement of said slider along said supports.

* * * * *

UNITED STATES PATENT AND TRADEMARK OFFICE

CERTIFICATE OF CORRECTION

PATENT NO. : 4 498 241

DATED : February 12, 1985

INVENTOR(S) : Tokuzo NAKAOKI

It is certified that error appears in the above-identified patent and that said Letters Patent is hereby corrected as shown below:

Column 13, line 13; change "would" to ---wound---.

Column 14, line 3; change "claim 7" to ---claim 1---.

Signed and Sealed this

*Fifteenth* Day of *October 1985*

[SEAL]

*Attest:*

DONALD J. QUIGG

*Attesting Officer*

*Commissioner of Patents and Trademarks—Designate*